United States Patent [19]

Thomsen

[11] Patent Number: 5,653,871
[45] Date of Patent: Aug. 5, 1997

[54] FILTER ASSEMBLY WITH O-RING PROTECTION

[75] Inventor: Jack W. Thomsen, Albuquerque, N. Mex.

[73] Assignee: Everpure, Inc., Westmont, Ill.

[21] Appl. No.: 640,289

[22] Filed: Apr. 24, 1996

[51] Int. Cl.⁶ ............................................. B01D 27/08
[52] U.S. Cl. ..................... 210/232; 210/236; 210/249; 210/282; 210/444; 210/450
[58] Field of Search ............................ 210/232, 234, 210/235, 236, 238, 249, 250, 282, 440, 443, 444, 450, 472

[56] References Cited

U.S. PATENT DOCUMENTS

| | | | |
|---|---|---|---|
| Re. 34,031 | 8/1992 | Thomsen et al. | 210/232 |
| Re. 34,050 | 9/1992 | Thomsen et al. | 210/232 |
| Re. 34,274 | 6/1993 | Foust | 210/236 |
| 3,746,171 | 7/1973 | Thomsen | 210/234 |
| 3,882,024 | 5/1975 | Holmes | 210/450 |
| 3,907,688 | 9/1975 | Close | 210/424 |
| 4,529,515 | 7/1985 | Selz | 210/234 |
| 4,548,227 | 10/1985 | Regunathan et al. | 137/268 |
| 4,735,716 | 4/1988 | Petrucci et al. | 210/232 |
| 4,857,189 | 8/1989 | Thomsen et al. | 210/232 |
| 4,904,382 | 2/1990 | Thomsen | 210/236 |
| 4,956,086 | 9/1990 | Thomsen | 210/232 |
| 5,022,986 | 6/1991 | Lang | 210/232 |
| 5,114,572 | 5/1992 | Hunter | 210/444 |
| 5,354,464 | 10/1994 | Slovak et al. | 210/240 |

*Primary Examiner*—Ernest G. Therkorn
*Attorney, Agent, or Firm*—Greer, Burns & Crain, Ltd.

[57] ABSTRACT

The present invention includes a liquid filtering filter head configured to receive a filter cartridge closure member, where the closure member has at least one seal member. The filter head has a generally cylindrical, inverted cup-like structure defining a chamber configured to receive the closure member and two openings in fluid communication with the chamber. Furthermore, the filter head features a guide for guiding a seal member as the closure member is inserted into the chamber, so that the seal member is prevented from becoming caught in the openings.

17 Claims, 3 Drawing Sheets

1

FILTER ASSEMBLY WITH O-RING PROTECTION

BACKGROUND OF THE INVENTION

This invention relates to a filter assembly, and more particularly to a filter head for such an assembly for releasably accommodating a disposable filter cartridge.

Conventional filter assemblies include filter cartridges which house a filter media, such as activated carbon, and a corresponding filter head designed to releasably and sealingly accommodate the filter cartridge and to couple the cartridge to a fluid flow line. One type of presently available filter cartridges for such heads has a generally cylindrical extension at its upper end provided with multiple input and output flow channels that allow the fluid in the cartridge to be easily connected to the fluid flow line by a filter head. One example of such a filter assembly is disclosed in commonly assigned U.S. Pat. No. Re. 34,050, incorporated herein by reference. In such an assembly, the filter head is provided with at least one O-ring for separating the inflow from the filtered outflow.

Certain prior art filter heads of this type have disadvantages relating to the engagement of the cartridge with the filter head. U.S. Pat. No. 5,354,464 discloses a filter head designed for use with a cartridge using a pair of O-rings to separate the flow paths of the liquid in the filter head and to isolate the filter system flow from the ambient atmosphere. A significant drawback of such a filter head is that the O-rings, which protrude radially from the exterior of the filter cartridge closure, become deformed or misaligned when the filter cartridge is inserted into the filter head. Specifically, the O-rings catch or snag on openings in the central head chamber. This in turn can prevent the fluid flow paths from remaining separate, can reduce the life of the filter cartridge and can even inhibit fluid flow in the fluid flow path.

Furthermore, other prior art filter heads are designed for use with cartridges having three O-rings to separate the fluid flow paths and to isolate the filter system flow from the ambient atmosphere. One such filter head and corresponding cartridge is disclosed in commonly-assigned U.S. Pat. No. Re. 34,050. A feature of that filter assembly is the provision of a vent opening in the head to relieve any pressure in the head which would impede the insertion of the cartridge. Regardless, the greater the number of O-rings provided on the cartridge, the greater the chance of an O-ring becoming deformed or misaligned upon insertion into the filter head as described above.

Thus, there exists a need, in a filter assembly having a filter cartridge with a multiple fluid flow port closure, for a filter head featuring a solution to the problem of O-ring deformation or misalignment. There is also a need for a filter assembly having a filter head of a certain design optionally providing air escape through a vent, or without such a vent, when a filter cartridge is inserted into the filter head.

Accordingly, a first object of the present invention is to provide an improved filter head having a guide to properly align the seal members on the filter cartridge during insertion in the filter head, preventing such seal members from becoming deformed, misaligned, torn or broken.

Yet another object of the present invention is to provide an improved filter head that vents air upon insertion of the filter cartridge into the filter head, thus balancing the internal head pressure.

A further object of the present invention is to provide an improved filter head configured for easy installation of a disposable filter cartridge.

Other objects and advantages of the invention will become more apparent from the following description and accompanying drawings.

SUMMARY OF THE INVENTION

The above-identified objects are met or exceeded by the present filter assembly. An important feature of the present assembly is a filter head having a guide that properly aligns the seal members of the filter cartridge closure member upon insertion of the closure member into the filter head. Another feature of the present filter assembly is to provide a filter head having a vent that facilitates cartridge insertion by balancing the internal head air pressure.

More specifically, the present invention includes a filter head configured to receive a filter cartridge closure member that has at least one seal member. The filter head has a generally cylindrical, inverted cup-like structure defining a chamber configured to receive the closure member. The head also has two openings that are in fluid communication with the chamber. A guide is located in at least one such opening for guiding the sea/member of the closure member as the closure member is inserted into the chamber, so that the seal member is prevented from becoming caught in the openings.

In another embodiment, the present invention provides a filter assembly for filtering a liquid, and includes a filter head and a filter cartridge, the head configured to receive the cartridge. The filter cartridge includes a pressure vessel closed at one end with a closure member, which includes a base portion sealingly disposed in an open end of the pressure vessel, and an elongated cylindrical portion with a pair of axially extending inlet and outlet passages, each with a corresponding aperture. The inlet passage is associated and in fluid communication with the first opening, and the outlet passage is associated and in fluid communication with the second opening. The closure member has at least one sea/member for separating the respective fluid flows of the two passages, and for isolating the chamber from the surrounding atmosphere.

It is preferred that the present filter head guide includes at least two, laterally-spaced, vertical rails which form a grille for preventing the seal members from becoming caught in at least one of the openings. In this manner, the condition of the seal members is preserved for a longer and more effective cartridge life. In addition, the present filter head preferably includes a pressure relief port in communication with the chamber of the filter head, which allows air in the filter head to be vented to the surrounding atmosphere upon insertion of the filter cartridge into the chamber. This pressure relief port thus facilitates the insertion of cartridges into the head.

DESCRIPTION OF THE PREFERRED EMBODIMENT

Figure 1:
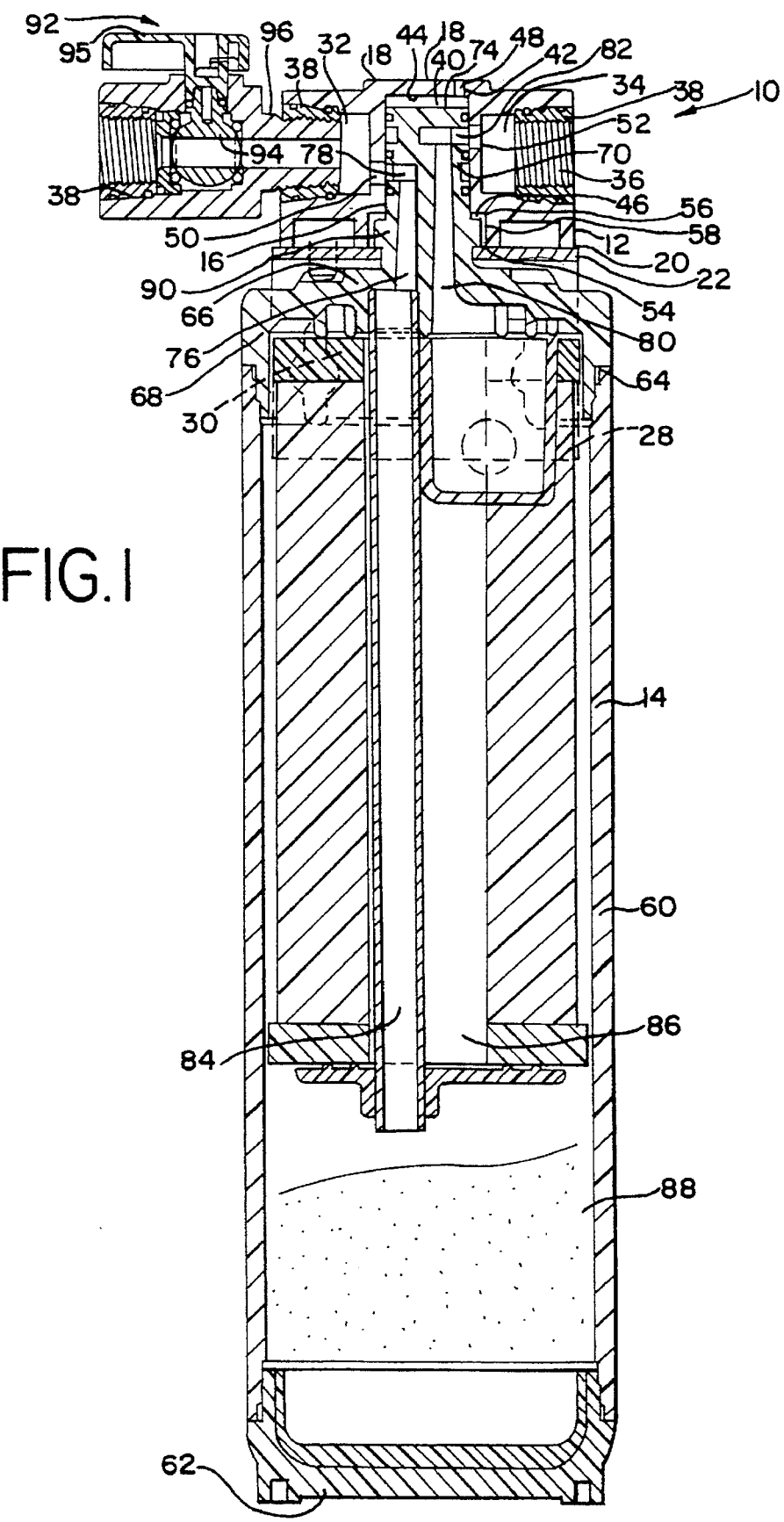
FIG. 1 is a vertical cross-sectional view of the present filter assembly.
Figure 2:
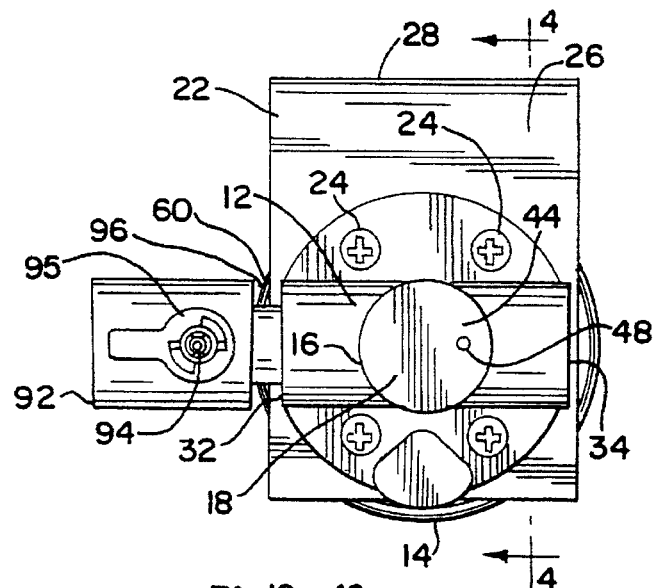
FIG. 2 is a top plan view of the filter assembly shown in FIG. 1.

Referring now to FIGS. 1 and 2, wherein like reference characters refer to like parts, a filter assembly, generally designated as 10, includes a filter head 12 and a filter cartridge 14.

The filter head 12, preferably made of molded plastic, has a generally cylindrical, inverted cup-like portion 16. Although a cylindrical, cup-like structure is preferred, other configurations are contemplated depending on the application. The filter head 12 has a generally planar top portion 18 and a base portion 20, to which a bracket member 22 is attached.

The bracket member 22 is attached to the base portion 20 by fasteners 24. It is preferred that threaded fasteners be employed, as indicated in FIG. 2, however, it is contemplated that alternative fastening techniques may be employed. Included on the bracket member 22 is a generally laterally extending plate-like portion 26 and a generally vertically extending portion 28 (shown hidden in FIG. 1) which is configured for removable attachment to a supporting structure such as a wall (not shown) by some suitable fastener. In the preferred embodiment, fastening apertures 30 (shown hidden) are provided for securing the bracket member 22, however, it is contemplated that alternative techniques may be employed.

The filter head 12 has at least two ports, and the preferred embodiment is provided with a first port 32 and a second port 34. Each port 32 and 34 has a threaded insert 36 friction fit into a corresponding bore 38 for coupling the ports 32 and 34 to a water line in a known manner, however other suitable connection techniques are contemplated. The first and second ports 32 and 34 as shown in FIG. 1 are generally co-planar, however, other configurations are contemplated in which the first and second ports 32 and 34 could be on different planes. The degree of vertical displacement of the ports may depend on the application and/or the design of the particular head. Moreover, in the embodiment shown, the first port 32 is an inlet port and the second port 34 is an outlet port, although these orientations could be changed depending on the type of flow design and/or filter arrangement in the filter cartridge 14.

The inverted cup-like portion 16 defines a chamber 40 having a generally cylindrical wall 42, a generally planar top portion 44 and an opening 46 opposite the top portion 44. In the preferred embodiment, the filter head 12 is shown with the opening 46 facing downward so that filter cartridge 14 is inserted in an upward manner. However, other filter head orientations are contemplated, in which the opening 46 faces upward or to one side, or some angle therebetween, and the filter cartridge 14 is inserted in a downward, lateral or angular manner, respectively. The top portion 44 has a pressure relief port or vent 48, such that the chamber 40 is in communication with the surrounding atmosphere. It is contemplated that the top portion 44 may be provided without the port 48. In such a situation, as is known in the art, the configuration of the cartridge, especially the number of sealing members such as O-rings, will vary. An example of such an alternate configuration is commonly-assigned U.S. Pat. No. Re. 34,031, incorporated by reference herein (best seen in FIG. 8).

Figure 3:
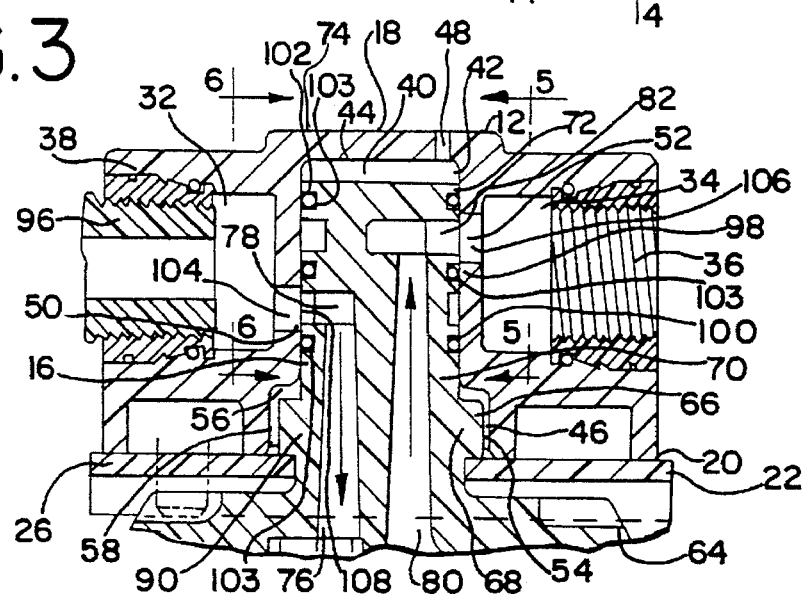
FIG. 3 is an enlarged fragmentary view of the filter head, shown in FIG. 1.

Referring now to FIGS. 1 and 3, in the preferred embodiment the cylindrical wall 42 has at least two openings, including a first opening 50 provided in the cylindrical wall 42 being in fluid communication with the first port 32, and a second opening 52 is provided in the cylindrical wall 42 being in fluid communication with the second port 34. It is preferred that the first opening 50 and the second opening 52 be disposed one above the other in the chamber 40 as indicated in FIG. 3, although their positions could be changed depending on the type of flow design and/or filter arrangement in the filter cartridge 14.

The filter head 12 further defines at least two lug openings 54 for removably engaging the filter cartridge 14. Each lug opening 54 is defined by a generally planar top portion 56 and a generally cylindrical side portion 58 which are in communication with the opening 46. While it is preferred that the lug openings 54 be employed to removably engage the filter cartridge 14 in the filter head 12, other suitable removable engaging arrangements are contemplated for securing cartridges in the filter head.

Referring again to FIG. 1, the filter assembly 10 further includes the filter cartridge 14, which is similar to that described in U.S. Pat. No. Re. 34,050. The filter cartridge 14 includes a pressure vessel 60, which may be made of metal or plastic, having a closed end 62 and an open end 64. A closure member 66 including a base portion 68 is sealingly disposed in the open end 64 of the pressure vessel 60, such as by chemical adhesive or RF welding. An elongated cylindrical portion 70 is preferably integral with the base portion 68. The closure member 66 is preferably made of molded plastic, but other equivalent materials, having equivalent strength, rigidity, moldability and durability properties of molded plastic are contemplated. In applications where the pressure vessel 60 is metallic, the closure member 66 is sealed to the open end 64 by crimping (best seen in FIG. 4). The elongated cylindrical portion 70 has a generally cylindrical wall 72, and a generally planar top 74, and is of a predetermined height such that, upon insertion of the closure member 66 into the chamber 40, the top portion 74 is in spaced relationship with the top portion 44 of the chamber 40.

The closure member 66 further includes at least two axially extending passages, an inlet passage 76 having an inlet aperture 78 formed in the cylindrical wall portion 72, and an outlet passage 80 having an outlet aperture 82 formed in the cylindrical wall portion 72. The inlet passage 76, the aperture 78, the outlet passage 80 and the aperture 82 are associated and in fluid communication with the first and second openings 50 and 52, respectively. While the relationship between the openings 50, 52 and the ports 32, 34 is preferred, such relationship could be changed depending on the type of filter arrangement in the filter cartridge 14.

The filter cartridge 14 further includes an inlet conduit 84 (best seen in FIG. 1) in fluid communication with the inlet passage 76 and an outlet conduit 86 in fluid communication with the outlet passage 80, an activated carbon filter media 88 and at least two bayonet lugs 90. The filter media 88 is preferably provided in granular form, but the filter media 88 could be provided in other forms, such as a carbon block or a precoat filter. The conduits 84 and 86 permit the passage of liquid through the filter media 88, allowing the filter media 88 to filter out particles, odor and gasses contained in the liquid. The at least two bayonet lugs 90 are preferably located on the cylindrical portion, engage the lug openings 54, and are retained therein by the bracket member 22 in a known manner, thus permitting the filter cartridge 14 to removably engage the filter head 12. While the bayonet lugs 90 and the lug openings 54 are described, other suitable fastening systems are contemplated, such as a threaded engagement.

Referring now to FIG. 2, in the preferred embodiment, the filter assembly 10 is connected into a water supply system (not shown) by a valve assembly 92. It is preferred that the valve assembly 92 incorporate a ball valve 94 and a conduit 96 which is threadably joined to the port 32 through the insert 36. The ball valve 94 further has an "on" position (best seen in FIG. 1), and an "off" position by which the water supply to the filter head 12 may be controlled by rotation of a handle 95.

Referring now to FIGS. 3–7, the closure member 66 engages the chamber 40 in a sealing manner. In the preferred embodiment depicted in FIG. 3, this sealing relationship is achieved by at least one first seal member which separates the respective flow of the inlet and outlet passages 76 and 80, and at least one second seal member which isolates these passages from the ambient environment. In the illustrated embodiment, the at least one first and second seal members include at least two, but preferably three O-rings, designated 98, 100 and 102, each of which are located in a corresponding groove 103.

The first O-ring 98 is disposed on the elongated cylindrical portion 70 between the first and second openings 50 and 52 respectively. The second O-ring 100 is disposed on the elongated cylindrical portion 70, being axially spaced from the first O-ring 98 and, upon engagement with the head 12, being located between the second opening 52 and the opening 46 of the chamber 40. In the illustrated embodiment, the third O-ring 102 is positioned on the elongated cylindrical portion 70, being axially spaced from the first O-ring 98 and, upon engagement with the head 12, being disposed between the first opening 50 and the top portion 44 of the chamber 40.

Although preferred, this arrangement could be changed depending on the type of flow pattern in the filter cartridge 14. The first O-ring 98 separates the flow of liquid between the inlet and outlet passages 76 and 80, respectively, and the second O-ring 100 seals the inlet and outlet passages from the surrounding atmosphere and prevents the leakage of liquid from the chamber 40. The third O-ring 102 also seals the water passages from the surrounding atmosphere and prevents the leakage of liquid through the pressure relief port 48. It is also contemplated that the present filter head 12 may be designed to accommodate filter cartridges having two O-rings of the type disclosed in U.S. Pat. No. Re. 34,031 (See FIG. 8 below).

An important feature of the present invention is that the filter head 12 is provided with a guide for guiding the least one seal member within the chamber 40 upon insertion of the closure member 66, so that the at least one seal member is prevented from becoming caught in at least one of the openings 50 and 52. Referring to FIGS. 3–7, in the illustrated embodiment, the guide includes at least one, and preferably two or more, laterally-spaced, generally vertical rails 104, 106 that form a grille in each opening 50, 52. The pair of first rails 104 are located in the first opening 50 and the pair of second rails 106 are located in the second opening 52. In the preferred embodiment, the rails 104 each have an inside edge 108 and the rails 106 each have an inside edge 110, each inside edge 108, 110 is generally flush with the cylindrical wall 42. The configuration and spacing of the rails 104, 106 in the corresponding openings is sufficient to prevent the unwanted catching of the O-rings within the openings during cartridge insertion. By maintaining the rails 104, 106 in closely aligned relationship to the cylindrical wall 42, as the elongated cylindrical portion 70 is advanced into the chamber 40, the O-rings 102, 98 and 100 progressively and slidingly engage the guide rails 104, 106, and as such do not become caught in the openings 50, 52 during cartridge insertion. In this manner, the position and condition of the O-rings are preserved.

The present guide is not limited to the number, configuration, angular orientation and/or spacing of the pair of rails 104 and 106. Moreover, while it is preferred that the rails 104 and 106 are integrally formed with the filter head 12, they could readily be made separately and attached to the filter head by chemical adhesive, RF welding or other suitable fastening technology. Furthermore, the edges 108, 110 of the rails 104 and 106 need not be oblique, but could be radiused or even somewhat wedge shaped.

Figure 4:
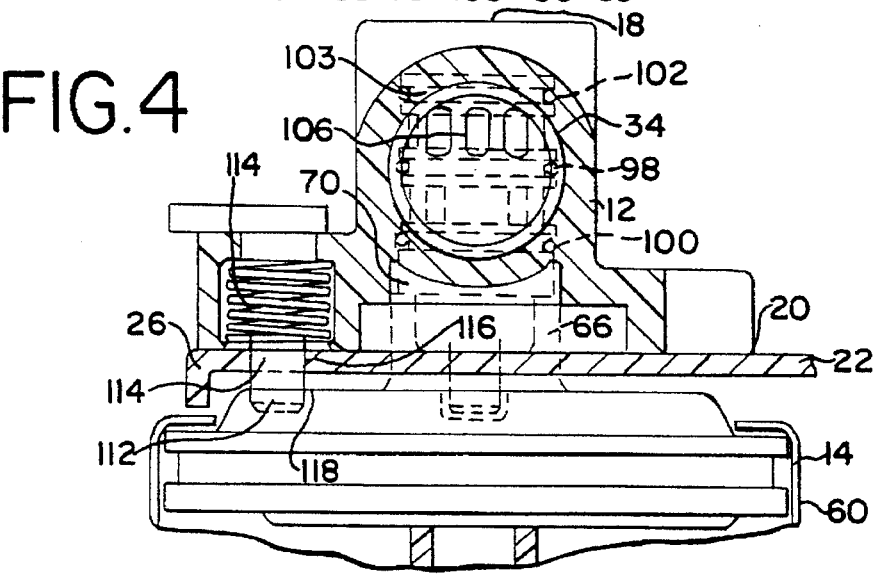
FIG. 4 is a sectional view taken along line 4—4 of FIG. 2 and in the direction indicated generally, depicting an alternate embodiment of the filter cartridge.
Figure 5:
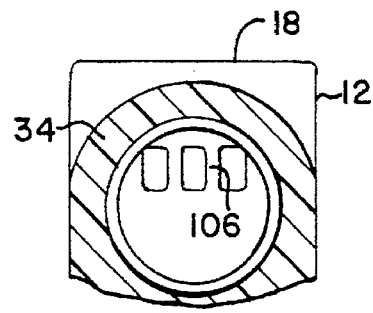
FIG. 5 is a sectional view taken along the line 5—5 of FIG. 3 and in the direction indicated generally.
Figure 6:
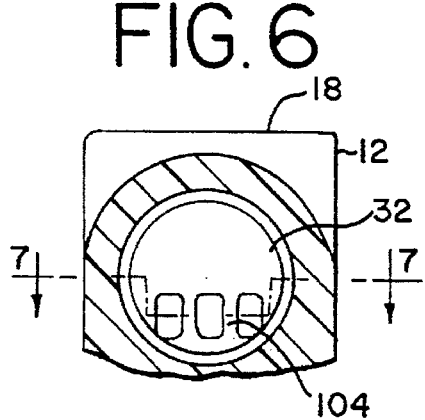
FIG. 6 is a sectional view taken along the line 6—6 of FIG. 3 and in the direction indicated generally.
Figure 7:
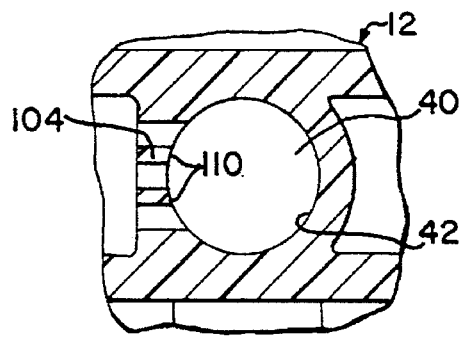
FIG. 7 is a sectional view taken along the line 7—7 of FIG. 6 and in the direction indicated generally.

Referring now to FIG. 4, the illustrated embodiment depicts the closure member 66 sealingly engaged to the chamber 40. This embodiment depicts another view of the relationship of the rails 106 to the O-rings 98 and 102 (shown hidden). It should be recognized that the rails 106 will only protect the O-rings that pass them, specifically the O-ring 102. The rails 104 engage the O-rings 102 and 98, but not the O-ring 100, thus preventing the O-rings 98 and 102 from becoming deformed or misaligned. Furthermore, the closure member 66 is now properly aligned in the chamber 40 so that the first aperture 78 is in association and in fluid communication with the first opening 50.

Another feature of the filter head 12 is a locating pin 112 biased by a spring 114 and passing through an alignment opening 116 in the lateral portion 26 of the bracket 22 to depend below the bracket. The alignment pin 112 engages an alignment bore 118 in the closure member 66. Upon insertion of the closure member 66 in the chamber 40 and the proper engagement of the bayonet lugs 90 with the openings 54, the alignment pin 112 engages the alignment bore 118 to assure proper alignment of the filter cartridge 14 in the filter head 12.

In operation, when a cartridge 14 is to be replaced, the valve assembly 92 is turned to the "off" position, prohibiting the flow of the liquid in the fluid assembly 10. The old filter cartridge 14 is disengaged from the filter head 12 by a push-and-twist motion which disengages the pin 112 and the lugs 90. A new filter cartridge 14 is engaged, using the bayonet lugs 90 and the corresponding lug openings 54, by a similar push-and-twist motion by the operator. As the cylindrical portion 70 advances into the chamber 40, the O-rings 102 and 98 are safely guided into position by the rails 104, 106. Also as the closure member 66 is advanced into the chamber 40, the air existing in the chamber 40 will be compressed. The pressure relief port 48 is provided to vent this air and thus balance the pressure within the filter assembly 10. Upon final engagement of the closure member 66 in the chamber 40, the first and second apertures 78 and 82, respectively, are brought into fluid communication with the first and second openings 50 and 52, respectively. The filter cartridge 14 is properly engaged when the alignment pin 112 engages the alignment bore 118. The valve assembly 92 is turned to the "on" position, allowing the liquid to be filtered to flow through the filter cartridge 14.

Figure 8:
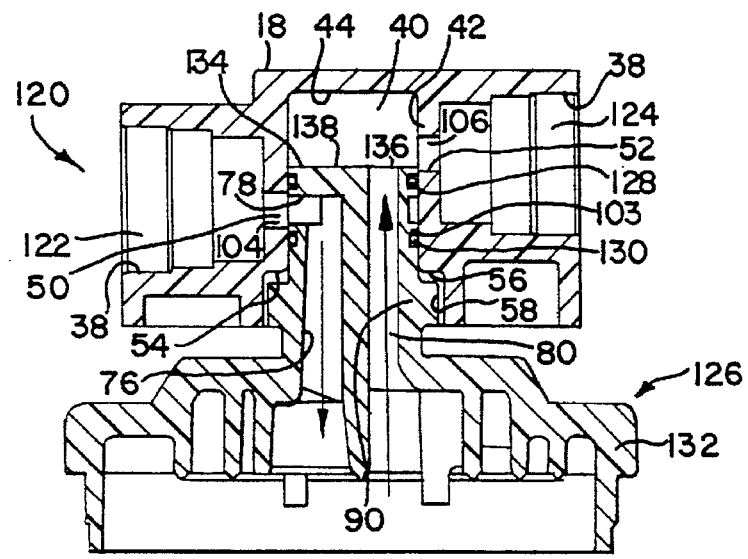
FIG. 8 is a partial vertical sectional view of an alternate embodiment of the filter assembly depicted.

Referring now to FIG. 8, an alternate embodiment of the filter head 12 is generally designated 120. The head 120 has many corresponding components with the head 12, and those are designated with identical reference numbers. The principal differences between the head 120 and the head 12 include that the head 12 has an inlet port 122 and an outlet port 124, the axes of which are vertically displaced from one another. Specifically, the port 122 is lower than the port 124 when viewed head on, as depicted in FIG. 8. As such, the ports, 122 and 124 are not coplanar, as is the case with the ports 32, 34 in the head 12, and cannot be connected in series in a straight line with other such heads by using straight connector nipples, which is a feature of the head 12.

Another difference between the head 12 and the head 120 is that the top portion 18 lacks a pressure relief port 48. The reason for that is because the head 120 is designed for use with a filter cartridge 126 having only two sealing devices, i.e. two O-rings, 128, 130. The cartridge 126 is substantially the same as disclosed in commonly-assigned U.S. Pat. Re. 34,031. Included on the cartridge 126 is a closure member 132 provided with an elongated cylindrical portion 134 which, in the preferred embodiment, is relatively shorter than the corresponding portion 70 of the cartridge 14. As in the cartridge 14, an inlet aperture 78 is in communication with an inlet passage 76. An outlet passage 80 has an outlet aperture 136 opening disposed in a top planar portion 138 of the closure member 132. The relatively shorter length of the cylindrical portion 134 means that when the cartridge 126 is engaged in the head 120, the unoccupied portion of the chamber 40 will be correspondingly larger than in the head 12. Also included on the head 120 are the rails 104, 106.

Only two O-ring grooves 103 are provided in the cartridge 126, one for the first O-ring 128 which separates the inflow through the aperture 78 from the outflow through the aperture 136, in the same manner as the O-ring 98 in the cartridge 14. The other O-ring groove 103 is configured for receiving the second O-ring 130, which, like the O-ring 100, isolates the inflow to the cartridge 126 from the ambient atmosphere. The lack of the pressure relief port 48 in the filter head 120 means that the chamber 40 in the cartridge 120 is not open to ambient, thus the upper O-ring 102 and the closed off top portion 74 are not needed. Aside from its lack of an upper O-ring and a closed off top portion 74, the cartridge 126 operates in the same manner as the cartridge 14.

While a particular embodiment of the invention has been shown and described, it will be appreciated by those skilled in the art that changes and modifications may be made thereto without departing from the invention in its broader aspects and as set forth in the following claims.

What is claimed is:

1. A filter head for filtering a liquid, said head configured for receiving a closure member of a filter cartridge having at least one seal member, the filter head comprising:
   a generally cylindrical, inverted cup-like structure defining a chamber configured for receiving the closure member, said structure having at least two openings being in fluid communication with said chamber; and
   guide means for guiding the at least one seal member within said chamber as the closure member is inserted therein, so that the at least one seal member is prevented from becoming caught in at least one of said openings.

2. The filter head of claim 1 wherein said guide means includes at least one rail in each said opening, said rail constructed and arranged for preventing the at least one seal member from becoming caught in at least one of said openings when the closure member is inserted into said chamber.

3. The filter head of claim 2, further including at least two of said rails being laterally-spaced relative to each other.

4. The filter head of claim 1 wherein said generally cylindrical, inverted cup-like structure further includes a wall defining said chamber, and said guide means includes at least one rail in each said opening being generally flush with said wall, said rail constructed and arranged for preventing the at least one seal member from becoming caught in at least one of said openings when the closure member is inserted into said chamber.

5. The filter head of claim 1, wherein said chamber includes a vent means for venting internal pressure of the filter head, whereby said internal pressure within the filter head is balanced with a surrounding atmosphere upon insertion of a filter cartridge therein.

6. The filter head of claim 5, wherein said vent means includes a pressure relief port, whereby said chamber is in communication with said surrounding atmosphere.

7. The filter head of claim 1 further including two generally co-planar ports being in fluid communication with said openings and chamber.

8. A filter assembly for filtering a liquid, said filter assembly comprising:
   a filter head configured for receiving a filter cartridge therein, said filter head including:
      a generally cylindrical, inverted cup-like structure defining a chamber configured for receiving a closure member of said cartridge and said structure having at least two openings in fluid communication with said chamber; and
      guide means for guiding an at least one seal member within said chamber as said closure member is inserted therein, so that the at least one seal member is prevented from becoming caught in at least one of said openings; and
   said filter cartridge including:
      a pressure vessel closed at one end;
      said closure member including a base portion sealingly disposed in an open end of said pressure vessel and an elongated cylindrical portion having a pair of axially extending inlet and outlet passages each, with a corresponding aperture formed in said elongated cylindrical portion, said inlet passage associated and in fluid communication with a first said opening, said outlet passage associated and in fluid communication with a second said opening; and
      at least one first seal member for separating the flow of said passages and at least one second seal member for isolating said chamber from a surrounding atmosphere.

9. The filter assembly of claim 8 wherein said guide means includes said openings having at least one rail constructed and arranged for preventing at least one of said at least one first and second seal members from becoming caught in at least one of said openings when said closure member is inserted into said chamber.

10. The filter assembly of claim 8 wherein said generally cylindrical, inverted cup-like structure further includes a wall defining said chamber, and said guide means includes at least one laterally-spaced rails being generally flush with said wall.

11. The filter assembly of claim 8 wherein said at least one first seal member includes a first O-ring disposed between said first and second openings, and said second seal member includes a second O-ring being axially spaced from said first O-ring and disposed on an opposite side of said second opening for separating the flow of said passages and for isolating said chamber from said surrounding atmosphere.

12. The filter assembly of claim 11 wherein the at least one second seal member further includes a third O-ring, said third O-ring being axially spaced from said first O-ring and disposed on an opposite side of said first opening, for separating the flow of said passages and for isolating said chamber from said surrounding atmosphere.

13. The filter assembly of claim 8, wherein said chamber includes a vent means for venting internal pressure of said filter head, whereby said internal pressure within said filter head is balanced with said surrounding atmosphere upon insertion of said filter cartridge therein.

14. The filter assembly of claim 13, wherein said vent means includes a pressure relief port.

15. The filter assembly of claim 8 further including a bracket member configured to be supported on a supporting structure, said bracket member being attached to said filter head.

16. A filter assembly for filtering a liquid, said filter assembly comprising:

a filter head configured for receiving a filter cartridge therein, said filter head including:
 a generally cylindrical, inverted cup-like structure defining a chamber configured for receiving a cartridge closure member having two O-rings, said structure having at least two openings in fluid communication with said chamber; and
 said openings having at least two laterally- spaced rails forming a grille that prevents at least one of said O-rings from becoming caught in at least one of said openings when a closure member is inserted into said chamber; and said filter cartridge including:
 a pressure vessel closed at one end;
 said closure member, including a base portion sealingly disposed in an open end of said pressure vessel and an elongated cylindrical portion having a pair of axially extending inlet and outlet passages, each with a corresponding aperture formed in said elongated cylindrical portion, said inlet passage associated and in fluid communication with a first said opening, said outlet passage associated and in fluid communication with a second said opening; and at least two O-rings disposed on said closure member, a first said O-ring disposed between said first and second openings, and a second said O-ring being axially spaced from said first O-ring and disposed on an opposite side of said second opening, for separating the flow of said passages and for isolating said chamber from a surrounding atmosphere.

17. The filter assembly of claim 16 further including a third O-ring, said third O-ring being axially spaced from said first O-ring and disposed on an opposite side of said first opening, for separating the flow of said passages and for isolating said chamber from the surrounding atmosphere.

* * * * *

UNITED STATES PATENT AND TRADEMARK OFFICE
CERTIFICATE OF CORRECTION

PATENT NO. : 5,653,871
DATED : August 5, 1997
INVENTOR(S) : Thomsen

It is certified that error appears in the above-indentified patent and that said Letters Patent is hereby corrected as shown below:

Column 1, line 60, delete "tom" and insert --torn--.

Column 2, line 21, delete "sea/member" and insert --seal member-- therefor.

Column 2, line 36, delete "sea/member" and insert --seal member-- therefor.

Signed and Sealed this

Fourteenth Day of July, 1998

Attest:

BRUCE LEHMAN

Attesting Officer

Commissioner of Patents and Trademarks